Aug. 14, 1945.    D. B. SALSTROM ET AL    2,382,102
GUNSTOCK FORMING MACHINE
Filed Feb. 25, 1943    10 Sheets-Sheet 1

Inventors
David B. Salstrom
David N. Salstrom
BY
Attorneys.

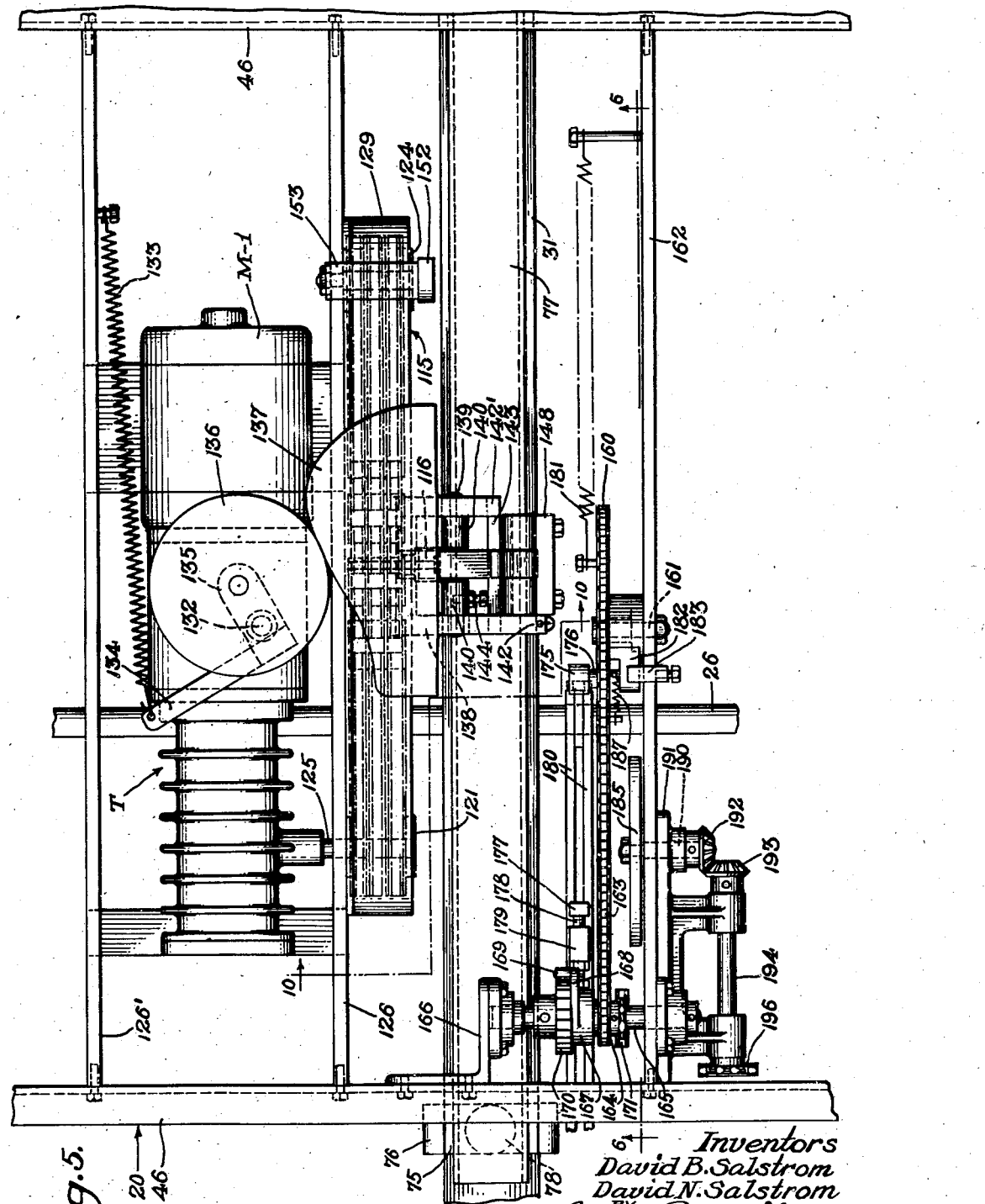

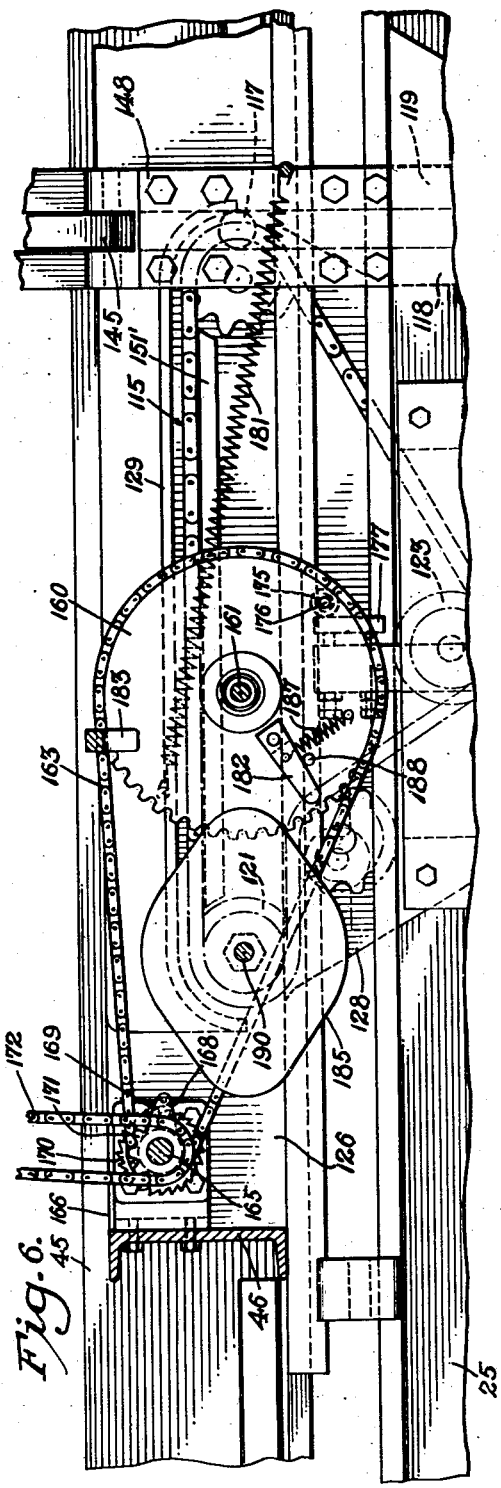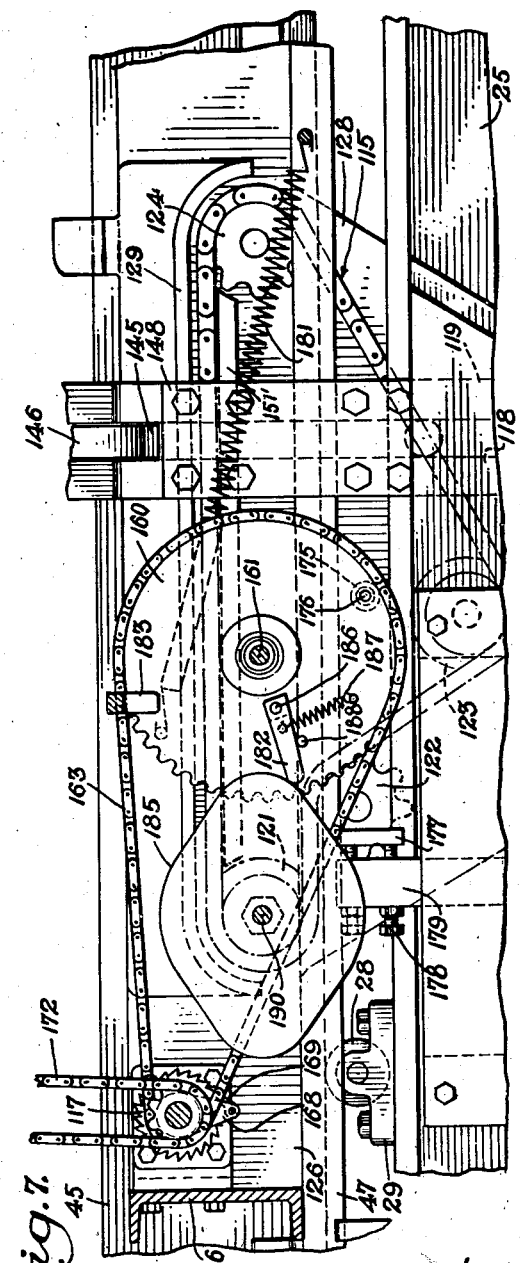

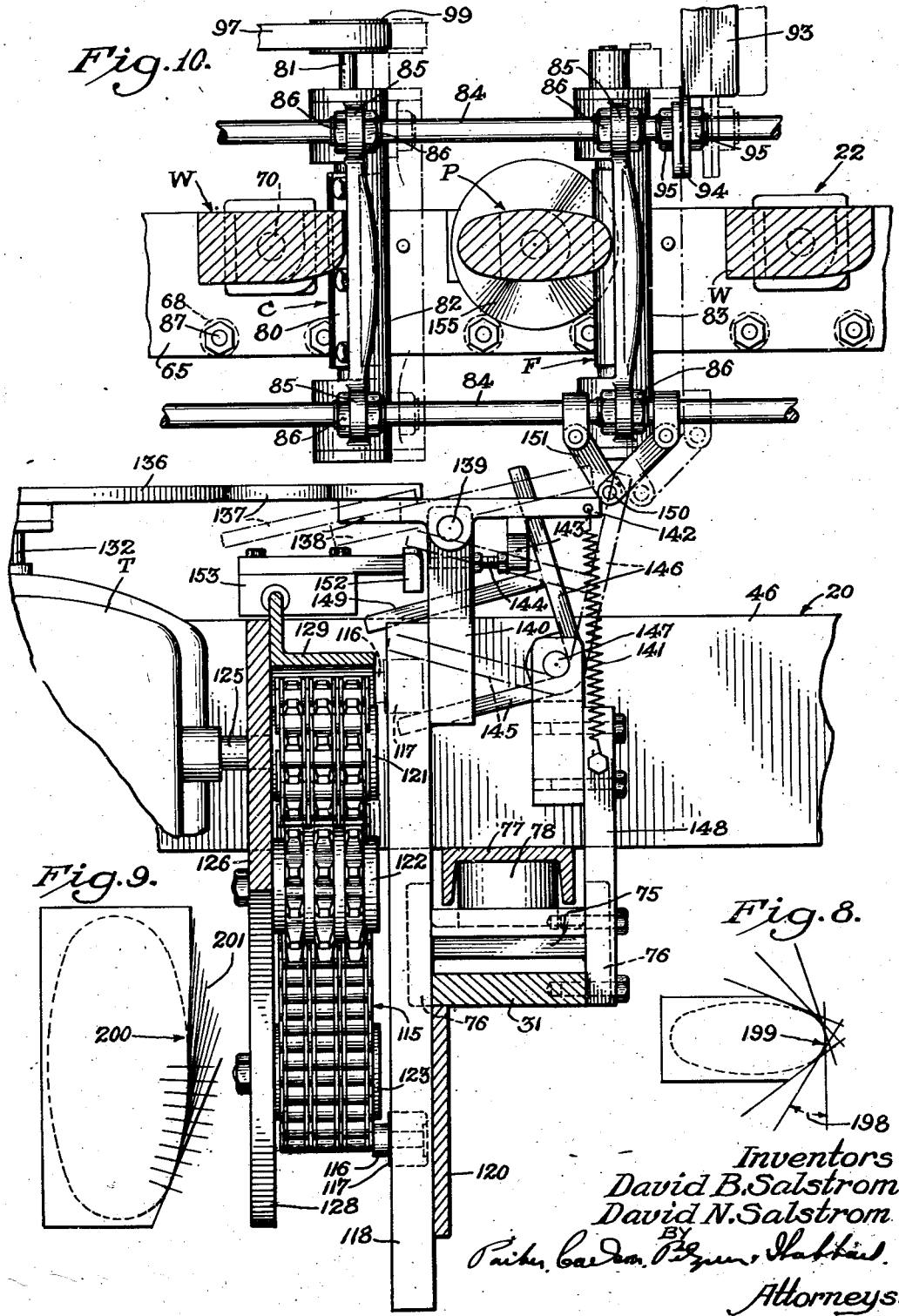

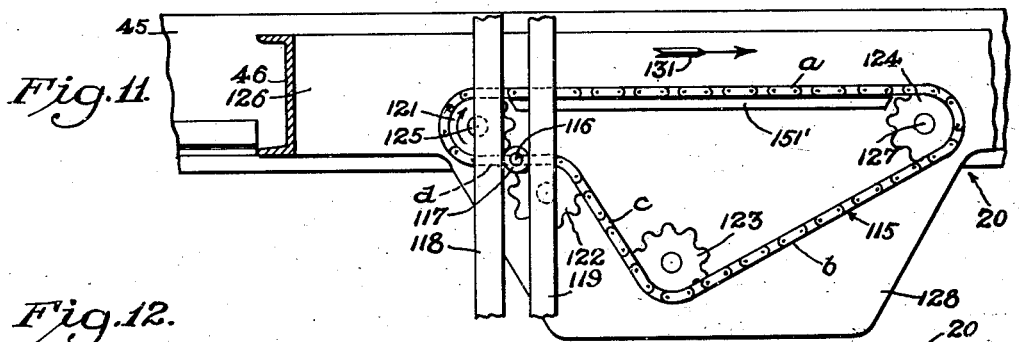
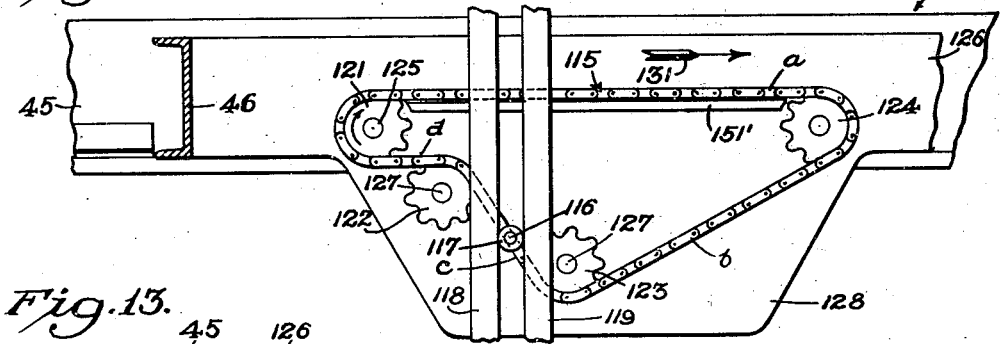
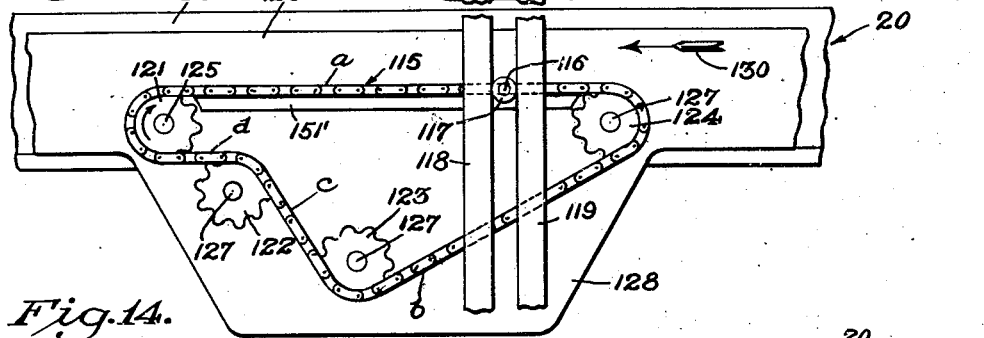
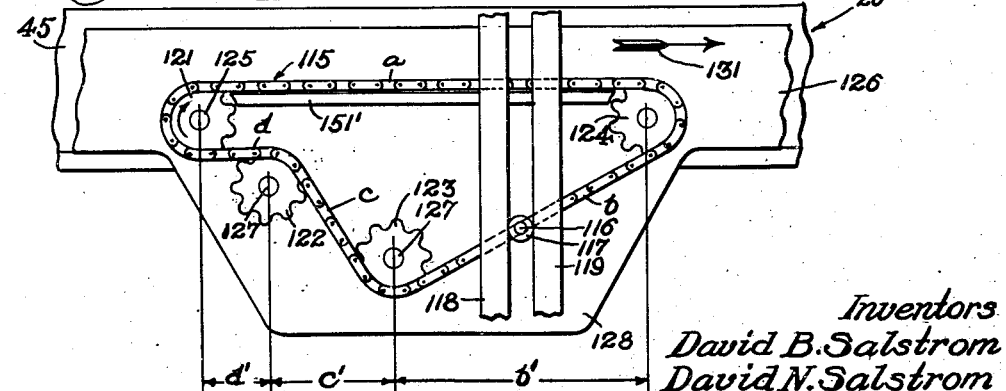

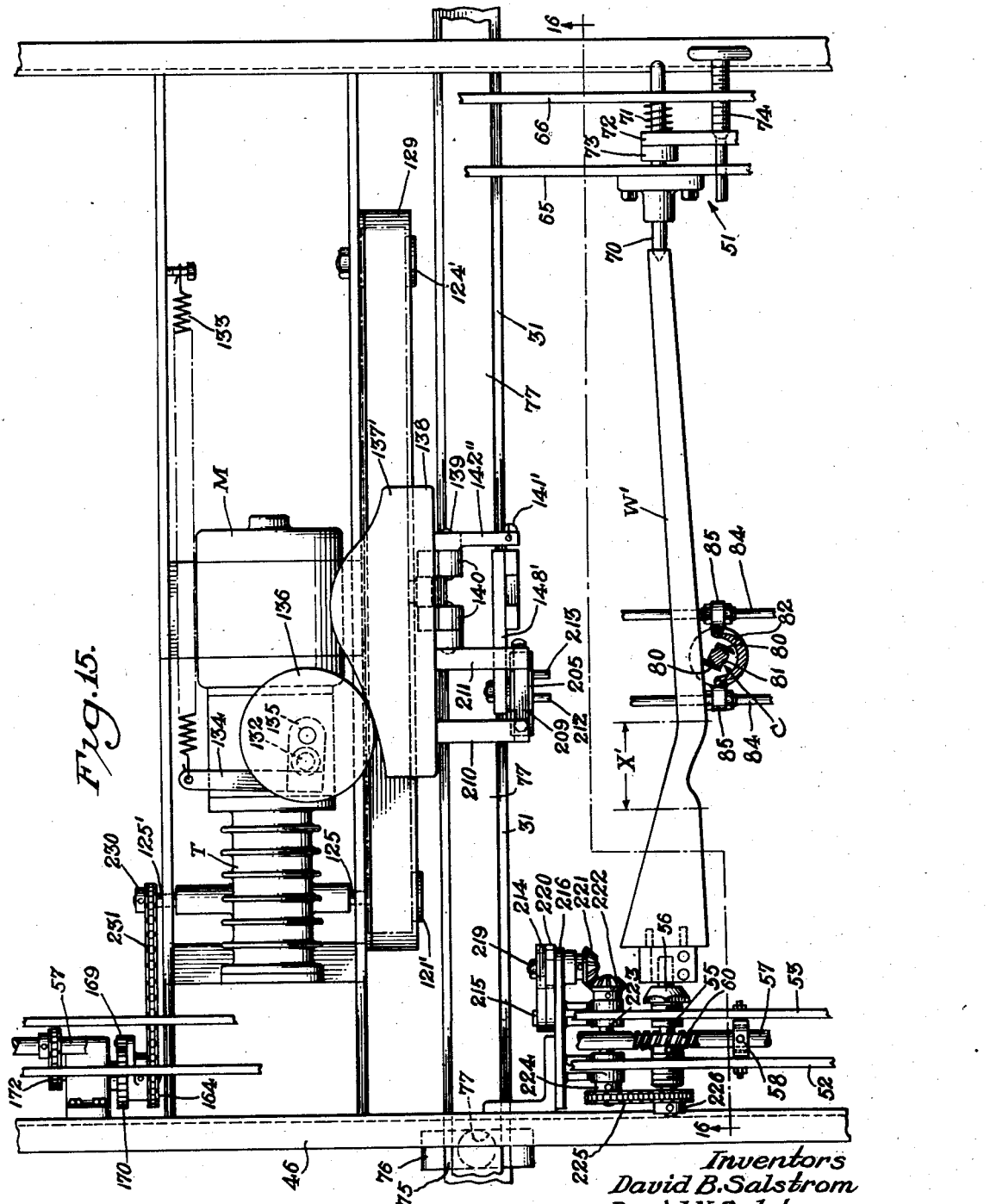

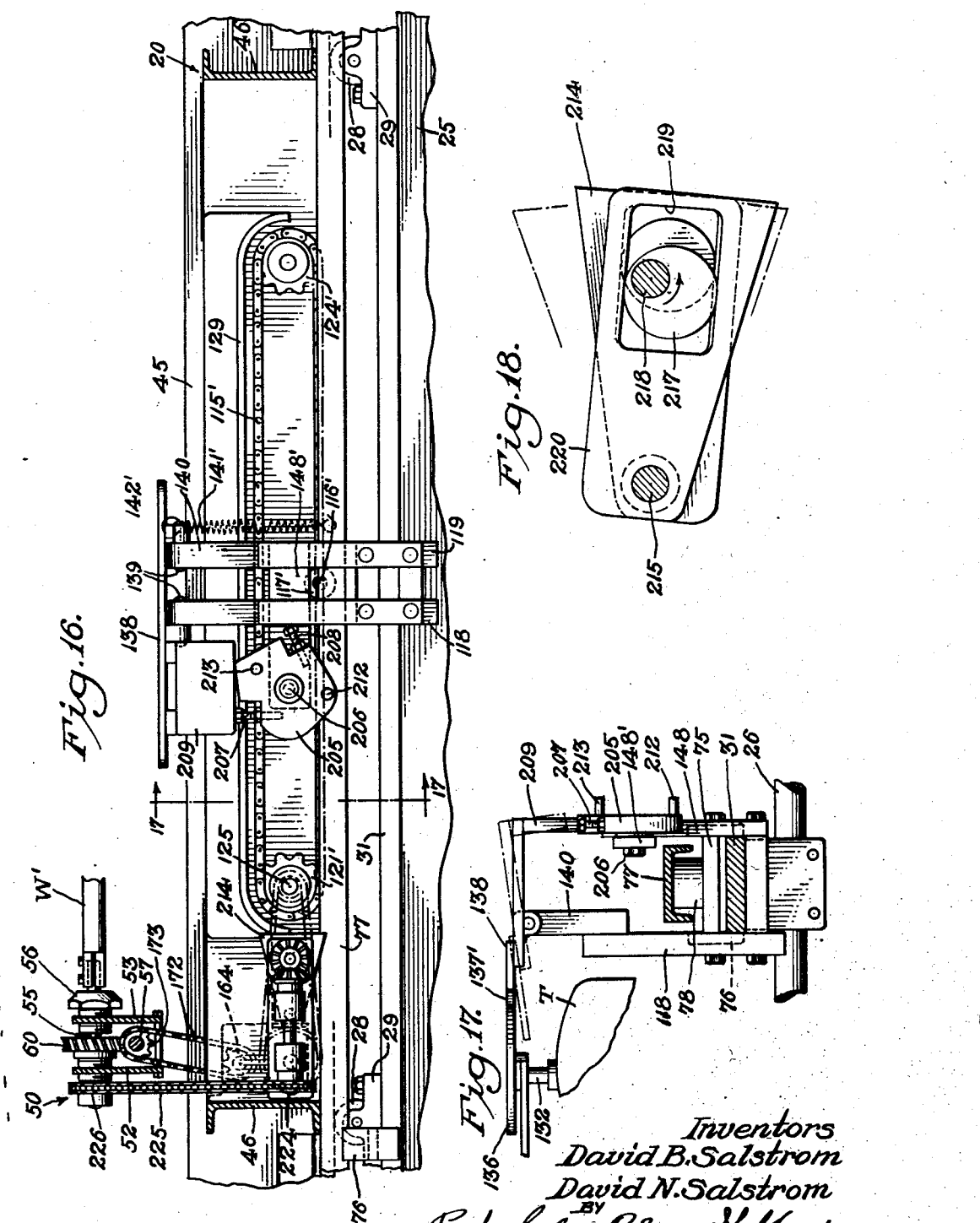

Patented Aug. 14, 1945

2,382,102

UNITED STATES PATENT OFFICE 2,382,102

GUNSTOCK FORMING MACHINE

David B. Salstrom and David N. Salstrom, Chicago, Ill., assignors to Salstrom Carving Machine Company, Chicago, Ill., a corporation of Illinois Application February 25, 1943, Serial No. 477,122

18 Claims. (Cl. 142—13)

The invention relates to an improved method of and machine for producing elongated articles of generally rounded contour but of somewhat irregular form such as gunstocks.

One object of the invention is to provide a novel method of controlling the relative movements of a work blank and cutting tool whereby the blank may be quickly and accurately cut to a predetermined irregular shape with a conventional cylindrical cutter.

Another object is to provide an improved machine adapted for rapid and economical production of high grade gunstocks or the like conforming accurately to a selected pattern.

Still another object is to provide a machine readily adaptable for producing irregularly contoured articles of a wide variety of different forms.

A further object is to provide an improved mechanism for reciprocating a machine table or carriage.

A more specific object is to provide novel work rotating means operable automatically to vary the length of the steps imparted to the work in different angular positions of the same.

Other objects and advantages of the invention will become apparent from the following detailed description of the preferred embodiments illustrated in the accompanying drawings, in which:

Fig. 5 is a sectional view taken in a horizontal plane substantially on the line 5—5 of Fig. 2 showing details of the carriage reciprocating and work rotating mechanisms.

Fig. 6 is a view partly in section taken in a vertical plane substantially along the line 6—6 of Fig. 5 showing details of the controls associated with the work rotating mechanism.

Fig. 7 is a view similar to Fig. 6 but showing the position of the parts at a different stage in the cycle.

Figs. 8 and 9 are diagrammatic views illustrating the method of regulating rotation of the work in accordance with the contour to be reproduced thereon.

Fig. 10 is a sectional view taken longitudinally of the machine in a vertical plane substantially along the line 10—10 of Fig. 5 showing details of the carriage reciprocating mechanism and associated apparatus.

Figs. 11, 12, 13 and 14 are diagrammatic views showing the relative position of the elements of the carriage feed mechanism at different stages of the reciprocating cycle.

Fig. 15 is a fragmentary plan view of a modified form of gunstock forming machine.

Fig. 16 is a view, partly in section, taken in a vertical plane substantially on the line 16—16 of Fig. 15 showing details of the carriage feed mechanism, feed control mechanism and work and pattern rotating mechanism.

Fig. 17 is a view taken in a vertical plane substantially on the line 17—17 of Fig. 16 showing details of the feed and feed control mechanisms.

Fig. 18 is a detail view of the feed control cam.

By way of illustration, the improved machine comprising the invention has been shown in the forms most suitable for producing wooden stocks for military carbines and rifles. It will be understood, of course, that the principles of the invention may be utilized in the production of other irregular shaped articles and in materials other than wood, as for example, plastics, metals, etc. Moreover certain of the mechanisms may find utility in other types of machines in which a workpiece or blank is acted on by a cutting tool. It will also be understood that various modifications and adaptations may be made in the form, construction and arrangement of the parts without departing from the spirit and scope of the invention as expressed in the appended claims.

The improved machine is of the general type in which one or more tools or cutters C are controlled as to their positions relative to work blanks W upon which they are intended to operate by a follower F coacting with a pattern P whose form is to be reproduced upon the blanks. The follower and tools are accordingly carried on a supporting structure which is relatively movable in a predetermined path with reference to a supporting structure on which the pattern and work blanks are carried. One of the supporting structures, preferably the pattern and work support, is additionally arranged for movement in a path substantially at right angles to the first mentioned path whereby a relative traverse of the follower from one end of the pattern to the other may be effected while the tools are similarly traversed over their associated work blanks. Novel mechanism is provided for effecting such relative movements and for regulating the rate of movement so as to enable the machine to reproduce relatively sharp projections, abrupt shoulders and other irregularities with a high degree of accuracy and without danger of splintering or otherwise marring the surface of the work.

Means is also provided for rotating the pattern and work blanks in timed relation to their relative translation with respect to the follower and tools. Successive sections of their peripheral areas are presented for coaction of the follower and tools, thereby enabling the entire peripheral surface of each blank to be shaped in conformity with that of the pattern. The invention contemplates a novel method of effecting such rotation so as to permit the accurate reproduction of generally rounded but unsymmetrical surface areas by means of a rotatably driven generally cylindrical cutter. More specifically, in reproducing such surfaces in accordance with the invention, the work blank is rotated intermittently in steps of varying length which are inversely proportioned to the radii of the surface areas being acted on by the tool. The invention also provides novel work and pattern rotating mechanism and associated control means for carrying out the improved method.

Figure 1:
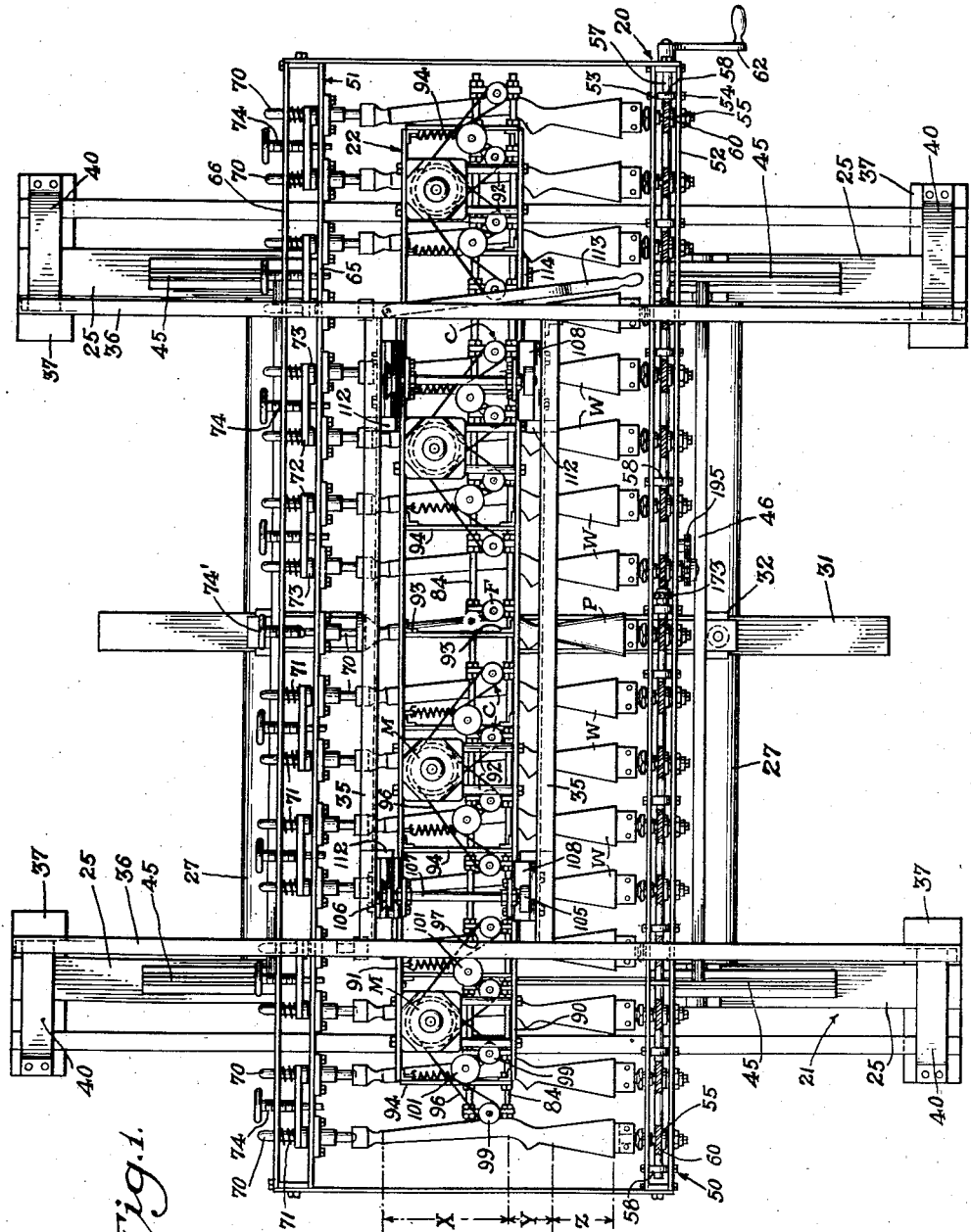
Figure 1 is a plan view of a gunstock forming machine embodying the features of the invention.
Figure 2:
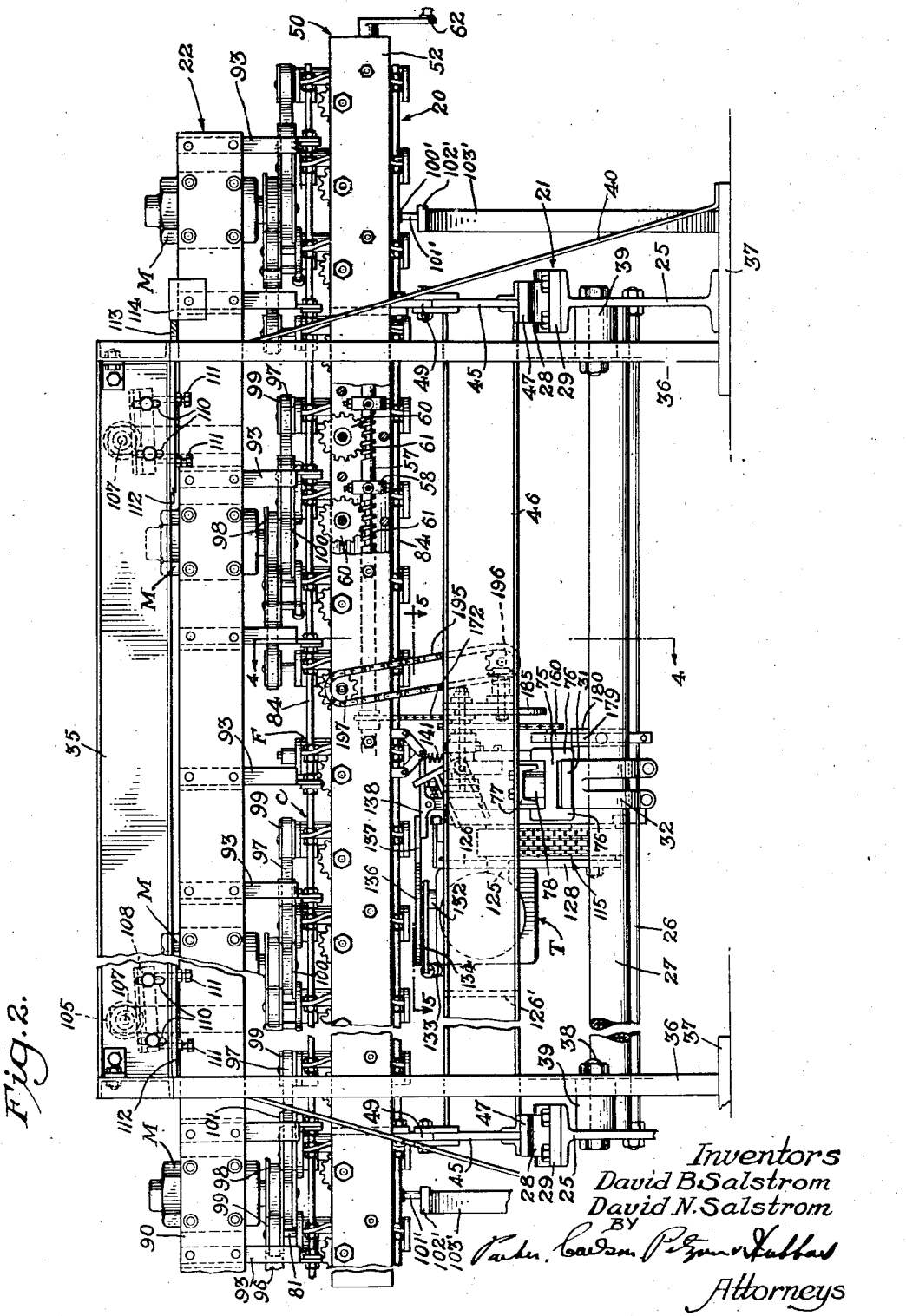
Fig. 2 is a front elevational view of the machine.
Figure 3:
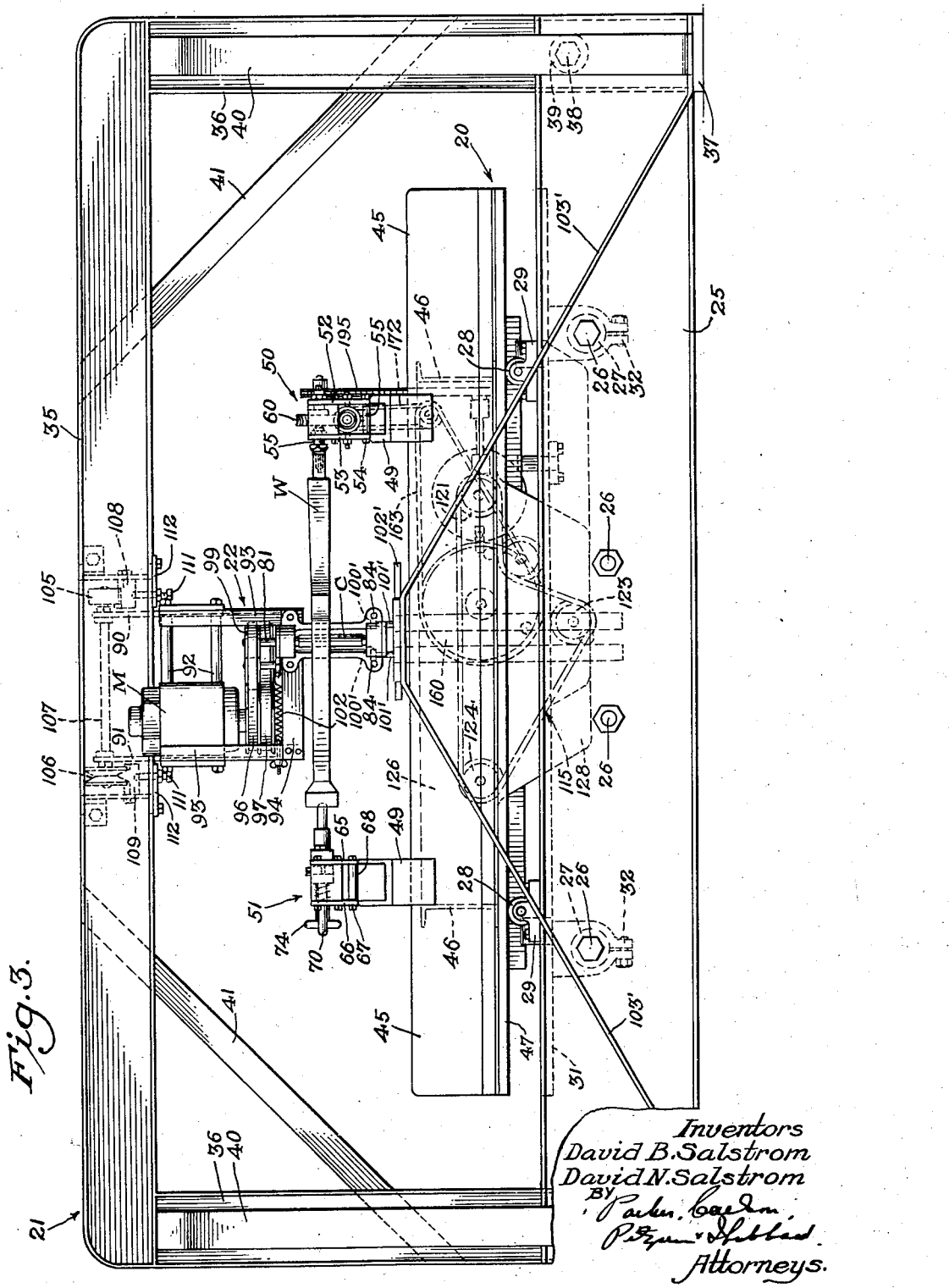
Fig. 3 is an end elevational view of the machine.

Referring now to Figs. 1–3 of the drawings, the pattern and work supporting structure of the exemplary machine comprises a generally rectangular carriage 20 adapted to support the pattern P and a plurality of work blanks W in a substantially horizontal plane with their axes parallel. The carriage is mounted upon a stationary base or frame 21 for reciprocation in a path generally parallel to the axes of the pattern and the blanks. Also supported on the frame 21, in this instance above the carriage, is the cutter and follower supporting structure herein shown as an elongated carrier 22 of rigid construction mounted for limited endwise movement transversely of the carriage.

The base or frame 21 upon which the translatable elements of the machine are mounted may be of any preferred construction. As herein shown, the frame is fabricated from standard shapes and comprises a pair of base members 25 in the form of I-beams arranged in parallel relation at opposite ends of the machine. The base members are rigidly connected by tie rods 26 of which one adjacent the front of the frame and another adjacent the rear of the frame extend through tubular spacing members 27. Support for the carriage 20 is provided by rollers 28 (Figs. 3, 4 and 16) journaled in brackets 29 secured to the upper flanges of the base members, there being two such brackets and rollers on each base member in the present instance.

For guiding the carriage 20 in its movements on the rollers 28, the frame is provided with a guide member 31 (Figs. 1–3) in the form of an elongated flat bar. This bar is disposed intermediate the base members with its parallel side edges extending in the direction in which the carriage is to be reciprocated, that is, from front to rear of the frame. Split clamping brackets 32 secured to the underside of the bar engage the spacing members 27 to support the bar and to hold it securely in fixed position.

To support the cutter and follower carrier 22 in operative relation to the carriage, the frame is constructed to provide a bridge extending over the carriage transversely of its reciprocatory path. The bridge as herein shown comprises a pair of spaced parallel channel members 35 supported at opposite ends by U-shaped uprights 36. The uprights are adapted to rest upon and are secured to base plates or shoes 37 which also support the base members 25. Bolts 38 extending through the legs of the respective uprights and the web of the adjacent base members and through tubular spacers 39 interposed therebetween hold the uprights rigidly in fixed relation with respect to the base members. Additional rigidity is imparted to the bridge structure by braces 40 extending between the shoes 37 and the legs of the uprights as shown in Fig. 2, and by braces 41 extending between the uprights and the channel members 35 as shown in Fig. 3.

The carriage 20 on which the work blanks and pattern are supported may be of any suitable construction. As herein shown, the carriage comprises a pair of end members 45 connected by front and rear channel members 46 to form a rigid generally rectangular frame or table. The end members are spaced apart so as to overlie the base members 25 and are provided on their lower edges with horizontally disposed track plates 47 adapted to run on the rollers 28.

Extending over the end members 45 and rigidly secured thereto as by brackets 49 are a headstock frame 50 and a tailstock frame 51 spaced apart for the reception of the pattern P and the work blanks W. As will be seen by reference to Figs. 1, 3 and 4 the headstock frame 50 comprises vertically disposed front and rear plates 52 and 53 rigidly secured together by bolts 54 and held in parallel spaced relation by suitable spacers encircling the bolts and interposed between the respective plates.

Journaled in the plates 52 and 53 are a plurality of horizontal spindles 55 (Fig. 4) each provided on its inner end with a work or pattern engaging center 56 of conventional form. The spindles are adapted to be driven in unison by a shaft 57 extending longitudinally of the headstock frame and suitably supported at intervals by bearings 58 (Fig. 1) carried between the plates 52 and 53. For this purpose each spindle is provided with a worm wheel 60 engaging a worm 61 fast on the shaft. Rotation of the shaft is effected either by power means to be described in detail hereinafter or manually through the medium of a hand crank 62 fixed on one end of the shaft which projects at one side of the headstock frame.

In the particular machine illustrated, the headstock frame has been shown as equipped with seventeen spindles. One of these spindles, preferably the center spindle, is intended to coact with the pattern P while the remainder of the spindles hold work blanks W. It will be understood, of course, that the machine may be equipped with any desired number of work spindles.

The tailstock frame 51 is generally similar to the headstock frame above described, comprising parallel plates 65 and 66, secured together by bolts 67 and held in predetermined spaced relation by spacers 68. Slidably supported in the plates 65 and 66 are a plurality of centers 70 in the form of cylindrical pins, there being one such pin or center axially alined with each spindle. The inner ends of the pins are suitably shaped for engagement with a work blank or pattern, and are urged forwardly to clamp the same against the spindle centers by springs 71.

As herein shown, the springs are interposed between the rear plate 66 and a sliding bar 72 arranged to bear against collars 73 fast on the pins. Each bar 72 is arranged to coact with two adjacent pins and a clamping screw 74 threaded into the frame plate 66 is provided to shift the bar forwardly and thus clamp the associated pins in their forward positions to guard against accidental release of a work blank. As the machine is equipped with an uneven number of spindles, due to the necessity of accommodating the pattern P, the center pin at the pattern holding position is adapted for individual clamping action by a clamp screw 74'. Moreover, since the pattern is ordinarily retained in place and not changed or shifted when the work blanks are removed, the spring actuator for the center pin may be omitted.

The carriage 20 is guided in its reciprocation in a path substantially parallel to the work blanks W and pattern P by the guide bar 31 and coacting guide means on the carriage. The guide means, as herein shown, comprises a plurality of shoes 75 (Figs. 2 and 10) each having flanges 76 at opposite sides adapted to extend over and slidably engage the side edges of the guide bar. The shoes are rigidly anchored to the underside of a channel member 77 attached to the cross members 46 of the carriage. Spacers 78 interposed between the channel member and the shoes serve to properly locate the latter.

As explained heretofore, the cutter C and follower F are mounted on the carrier 22 which is supported to move transversely of the carriage for engaging and disengaging these elements from their associated work blanks and pattern. The cutters may be of any preferred type suitable for operating upon the particular material constituting the work blanks. In the exemplary machine illustrated, the cutters are the conventional cylindrical type employed in woodworking machines. Each cutter comprises one or more elongated blades 80 (Fig. 10) extending longitudinally of and removably secured to the central section of an elongated rotatable spindle 81. The cutting edges of the blades thus follow a cylindrical path when the spindle is rotated.

The spindle 81 is journaled in suitable bearings formed at opposite ends of a generally semicylindrical housing 82, the housing being open at one side so that the cutter blades may be brought into operative engagement with the work blank. In the present instance, the cutters are arranged with their rotational axes substantially perpendicular to the longitudinal axes of the work blanks and offset laterally with respect thereto as shown in Figs. 1 and 10.

The follower F is rotatably supported in a housing 83 similar in all respects to the housing 82 and located so that the position of the follower with respect to the pattern is the same as the position of each cutter with respect to its associated work blank. The follower is preferably in the form of a roller having an outside diameter corresponding to the effective diameter of a cutter.

To hold the cutters and followers in fixed spaced relation, the housings 82 and 83 are assembled on a series of spacing rods 84 arranged in pairs disposed one above the other. The rods extend through apertured lugs 85 projecting laterally from opposite sides of the housings adjacent the upper and lower ends thereof. The rods are formed with threaded sections spaced apart in accordance with the desired spacing of the housings and adapted for the reception of nuts 86 between which the lugs 85 may be clamped to secure the housings to the rods. By utilizing four such rods, extremely rigid support for the housings is insured and accurate spacing is maintained at all times.

The housing assembly is suspended from the main frame portion of the carrier 22 which, as shown in Figs. 2 and 3, comprises elongated front and rear members 90 and 91 in the form of relatively wide flat bars arranged in parallel spaced relation. The members are rigidly connected by bolts and are held in proper spaced relation by suitable spacers 92. Support for the housing assembly is provided by a plurality of brackets each comprising a pair of angle bars 93 (Figs. 1—4) bolted or otherwise secured at their upper ends to one of the frame members 90, 91, and connected at their lower ends by cross bars 94. The cross bars are apertured to receive the upper pair of spacing rods 84. Nuts 95 threaded on the rod on opposite sides of the cross bars, as shown in Fig. 10, serve to clamp the parts securely in assembled relation.

Suitable means is provided on the carrier frame for rotatably driving the cutter spindles 81 at high speed. The driving means, as herein shown, comprises a plurality of electric motors M mounted on the rear member 91 of the carrier frame. Each motor, in this instance, is arranged to drive four of the cutter spindles through the medium of two independent drive belts 96 and 97. The belt 96 passes over a pulley 98 fast on the motor shaft and over alined pulleys 99 on the two spindles 81 to the left of the motor (as viewed in Fig. 1). Belt 97 passes over a pulley 100 on the motor shaft and over the pulleys 99 on the two spindles to the right of the motor. Idler pulleys 101 are urged against the belts 96 and 97 by springs 102 (Fig. 3) to maintain the belts taut.

As previously explained, the carrier 22 is supported on the machine frame above the carriage 20 for movement transversely with respect thereto. The support in this instance is provided by a plurality of rollers mounted on the carrier and adapted to run on rails carried by the bridge members 35. As shown in Fig. 1, two pairs of rollers are provided in the exemplary machine. Each of these pairs consists of a cylindrical roller 105 and a grooved roller 106 mounted at opposite ends of a shaft 107 extending through and journaled on the side plates 90 and 91 of the carrier frame. The rollers 105 are adapted to run on flat track rails 108 (Fig. 3) suitably attached to the inner side of the front bridge member 35. Grooved rollers 106 are adapted to run on inverted V-shaped rails 109 suitably attached to the inner side of the rear bridge member 35. The rails 109 in cooperation with the grooved rollers 106 thus serve to guide the carrier in its movements. Additional guidance is provided by roller members 100' (Figs. 2 and 3) carried on pins 101' projecting upwardly from plates 102' supported at the ends of the machine by angularly disposed bracing bars 103'. The roller members are positioned to engage the inner sides of the spacing rods 84 and effectually prevent lateral movements of the cutter housing assembly without interfering with the operative movements of the carrier.

To enable the cutters to reproduce the contour of the pattern on the blanks, the carrier is yieldably urged in a direction effective to feed the cutters into the sides of the blanks. While any suitable means may be employed for this purpose, the exemplary machine is arranged for gravity feed. To this end, the track rails 108 and 109 are mounted in an inclined position, as shown in Fig. 2. The force with which the cutters are fed against the work blanks is dependent upon the inclination of the rails and, to permit of adjustment of this force to suit varying conditions, the rails are preferably secured to the bridge members 35 by means of bolts engaging vertical slots 110 in the webs of the bridge members. Adjusting screws 111 threaded into plates 112, attached to the lower flanges of the bridge members are arranged to bear against the lower edges of the rails at opposite ends thereof. By turning these screws, the rails can therefore be set at any angle required to produce the cutting force most suitable for the work being performed.

The carrier is adapted to be shifted manually to retract the cutters from the work blanks by means of a hand lever 113 pivoted on the cross member 35 of the machine frame. This lever, which is arranged to swing in a horizontal plane, is adapted to coact with an upstanding lug 114 on the front member 90 of the carrier as shown in Fig. 1. Latch means of any preferred type may be utilized for locking the hand lever and carrier in retracted position.

The extent of movement of the carrier, and therefore the depth of cut taken by the cutters in the work blanks, is controlled by the follower F through its engagement with the surface of the pattern P. The cutters of course only act at one point on their work blanks and, in order to enable them to shape the blanks throughout their entire length, a relative traverse of the cutters and blanks longitudinally of the latter is required. In shaping irregular articles such as gunstocks, it has been found that different rates of traverse or feed are required for sections of different contour. Thus, in shaping the forward portion x of a carbine stock (Fig. 1), a faster feed may be employed than that required for shaping the intermediate section y to provide the "pistol grip" characteristic of gunstocks of this type. A still more rapid feed may be utilized in shaping the shoulder section z of the stock. In each instance, the work is preferably fed against the rotation of the cutter, that is, so that the cutter makes what is commonly known as a "climb cut."

The invention provides novel drive mechanism for reciprocating the carriage 20 to effect the relative movements above referred to at the most advantageous feed rates. The drive mechanism in its preferred form comprises an endless flexible drive member, herein shown as a conventional roller type chain 115 (Figs. 3–5 and 10–14) running over a plurality of sprocket wheels journaled on the carriage and having one point of the flexible member anchored against movement in the direction of carriage reciprocation. Provision is made for driving one of the sprocket wheels thereby causing it to travel along the chain and impart reciprocating movement to the carriage in a linear path. In operation, the loop formed by the flexible member is swung bodily about the anchoring point as a pivot, while the anchoring point moves transversely of the path of carriage reciprocation.

To anchor the chain, as above described, the pin connecting one chain link with the adjacent link is replaced by an elongated stud 116 (Figs. 10–14) projecting at one side of the chain. A roller 117 journaled on the projecting end of the stud is confined in a channel or guideway formed by spaced vertically disposed guide members 118 and 119 rigidly attached to a stationary plate 120 carried by the guide bar 31, as shown in Fig. 10. The guide bars 118 and 119 effectively prevent movement of the roller 117 in a horizontal direction, yet permit it to move freely in a vertical plane, that is, transversely of the path of the carriage.

The sprocket wheel arrangement employed in the improved drive mechanism may vary both as to the number of wheels and their position with respect to each other in accordance with the rate or rates of feed to be imparted to the carriage. In the exemplary form of the machine shown in Figs. 1–12 of the drawings, four sprocket wheels, 121, 122, 123 and 124, are provided. Sprocket wheel 121, in this instance, is the driven sprocket and is keyed to a shaft 125 (Figs. 5 and 10–14) journaled in a cross member 126 of the carriage. The other sprockets are rotatably supported on studs 127 anchored to the cross member or to an extension 128 projecting from its lower edge.

The sprocket wheels 121—124 are arranged, in this instance, to guide the chain in manner such as to provide a straight, horizontal upper run a (Figs. 11–14) and to divide the lower run into three angularly related sections. One section b of the lower chain run between the sprockets 123 and 124 is downwardly inclined at a relatively shallow angle while the adjacent section c between the sprockets 122 and 123 is upwardly inclined at a substantially steeper angle. The third section d between the sprockets 121 and 122 is substantially horizontal. A guard 129 carried on the cross member 126 projects over the chain to protect the same from foreign material such as the chips removed from the work blanks.

The inclination of the chain runs determines the rate at which the carriage is advanced in selected sections of its range of travel. Thus, when the sprocket wheel 121 is driven, the chain is drawn over it and the companion sprockets so that the entire chain loop describes a path about the roller carrying link. Since the sprockets are mounted in fixed positions, the shape or outline of the chain loop remains unchanged. The roller carrying link remains stationary with reference to the horizontal plane and, as the chain loop is traversed bodily back and forth, the stationary link progresses through the successive chain runs.

When the sprocket wheel 121 is rotated in a clockwise direction with the roller 117 in the horizontal upper run a, movement is imparted to the carriage in the direction of the arrow 130 (Fig. 13) and proceeds at the same rate as the chain advances. As the roller passes over the outer periphery of the sprocket wheel 121 its horizontal component of movement initially decreases and then increases at a uniform rate, thus resulting in a uniform acceleration and deceleration of the carriage.

When the roller 117 is located in the lower chain run, rotation of the sprocket wheel 121 acts to translate the carriage in the direction of the arrow 131 (Figs. 11, 12 and 14). The rate of carriage advance corresponds to the horizontal component of the particular section of the chain run in which the roller is located. This characteristic of the mechanism is therefore utilized in obtaining the different feed rates required for shaping irregular articles.

The varying feed rates provided by the exemplary embodiment of a mechanism will be readily understood by reference to Figs. 6, 7 and 11-14 of the drawings. Thus, when the carriage is in its extreme forward position, the chain loop is at the left of the guide channel as shown in Fig. 6 and the roller 117 is located at the outer periphery of the sprocket wheel 124. As the sprocket 121 is driven in the direction of the arrow, the chain is shifted bodily to the right, that is, in the direction of the arrow 131 (Fig. 14) and the roller progresses through the inclined run b. The rate of carriage advance, represented by the line b' which corresponds to the horizontal component of the run b, is timed to provide the proper feed rate for shaping the relatively straight section x of the work blanks.

As the chain continues its movement to the right with the carriage, and while the cutters are traversing the irregular section y of the work blanks, the stationary link progresses through the run c (Fig. 12). Due to the steep slope of this run, the rate of carriage movement is still further retarded as indicated by the line c' to enable the cutters to accurately reproduce the abrupt shoulder presented by the "pistol grip" portion of the gunstock.

When the cutters are passing over the relatively straight shoulder section z of the work blanks, the stationary link progresses through the horizontal run d and the carriage advances at its maximum rate, as indicated by the line d'. Thus, by appropriate location of the various sprocket wheels, the various chain sections can be disposed at suitable angles to provide the feed rates required for any type of work.

The movement of the carriage in the direction indicated by the arrow 130 (Fig. 13) is, in this instance, a return movement in which the cutters are idle and, to avoid loss of time, is executed at a rapid rate. The change in direction of carriage movement at each end of its stroke is effected with uniform acceleration and deceleration as the roller 117 passes over the outer peripheries of the sprocket wheels 121 and 124. In this way, smooth, shockless reciprocation of the carriage is insured.

The power mechanism utilized to drive the sprocket shaft 125, as herein shown, comprises an electric motor M—1 (Fig. 5) and a variable speed transmission T. The motor and transmission are supported on the carriage by the cross member 126 and a companion cross member 126' extending between the front and rear members 46 of the carriage. The variable speed transmission may be of any suitable and well known type. In the particular transmission illustrated, the speed imparted to the sprocket drive shaft 125 is controlled by a rockshaft 132 (Figs. 5 and 10) projecting vertically from the transmission housing. A spring 133, acting on an arm 134 rigid with the rockshaft, acts to yieldably maintain the transmission adjusted for driving the shaft 125 at maximum speed.

Means is provided for automatically adjusting the transmission T to vary the feed rate of the carriage in selected portions of its travel and thus supplement the varying feed rates provided by the chain drive mechanism. For this purpose, a second arm 135 is fixed on the speed adjusting shaft 132 to project radially of the shaft substantially at right angles to the arm 134. Journaled on the end of the arm 135 is a follower roller or disk 136 adapted for engagement with a stationarily supported cam plate 137 incident to the reciprocation of the carriage. The cam plate, as herein shown, is positioned to meet the roller 136 and slow down the sprocket drive shaft 125 while the carriage is traversing the follower and cutters over the section y of the pattern and work blanks having the irregularly shaped "pistol grip" formations. As previously explained, the chain run c is suitably inclined to reduce the feed rate of the carriage in this position of its stroke. Accordingly, the cam action above described, together with the inclined chain run act to produce a very slow adjustable feed movement of the carriage and enable the tool to shape the irregular projections on the work blanks without splintering or otherwise marring the same.

In order to avoid slowing down the power drive mechanism during the return movement of the carriage, means is provided for shifting the cam plate 137 to an inactive position during this portion of the carriage reciprocation. To this end, the cam plate is mounted on a bracket 138 (Figs. 4, 5 and 10) pivotally supported on a horizontal shaft 139 carried between a pair of upright members 140 rigidly attached to and projecting upwardly from the guide bars 118 and 119. The bracket and cam plate are yieldably urged into the active position shown in full lines in Fig. 10 by a spring 141 acting on an arm 142 projecting outwardly from the rear edge of the plate. A depending stop bar 143 extending between the arm 142 and an arm 142' projecting from the rear edge of the bracket in parallel with the arm 142 is positioned to coact with an adjustable stop screw 144 on one of the upright members 140 to determine the limit position of the cam plate.

Advantage is taken of the vertical movements of the roller 117 in the guideway formed by the guide members 118 and 119 to shift the cam plate from the active position to the inactive position shown in broken lines in Fig. 10. To this end, a bell crank lever, having two arms 145 and 146 disposed substantially at right angles to each other, is pivoted as at 147 on a bracket 148 rigidly attached to the guide bar 31 or other suitable part of the stationary machine base. The arm 145 is arranged to project between the guide bars 118 and 119 and thus into the path of the roller 117. When the roller is located in the lower run of the chain 115 as it is during the rearward or feeding movements of the carriage, the arms 145 and 146 occupy the position shown in full lines in Fig. 10. As the roller progresses into the upper run of the chain, the arm 145 is rocked upwardly and, in this movement, a parallel arm 149 rigid with the arm 146 engages the stop bar 143 to rock the cam plate and its supporting member to the position shown in broken lines in Fig. 10. As the roller 117 is located in the upper chain run throughout the entire return movement of the carriage, the cam plate is thus held in an active position so that the transmission is enabled to return the carriage at a rapid rate. In this way, loss of time is avoided and the productive capacity of the machine is substantially increased.

The vertical movements of the roller 117 in the guideway may also be used to advantage in shifting the carrier 22 to retract the cutters from the work blanks during the return movement of the carriage. Such retraction of the tools from the work has been found to be advantageous in reproducing certain types of patterns, such as the stock for the carbine herein shown. Retraction of the carriage is effected in the present instance by the arm 146 of the bell crank engaging a cross bar 150 carried by a bracket 151 anchored to the spacing bars 84 of the carrier. When the roller is in the lower chain run, the lever arm occupies the full line position shown in Fig. 10, the carrier is shifted by gravity to the full line position shown in this figure. Upon movement of the roller into the upper chain run, the lever arm is rocked to a position effective to shift the carriage to the position shown in broken lines in Fig. 10. Sagging of the chain between the sprocket wheels 121 and 124, due to the force exerted by the carrier on the roller 117, is effectually prevented by a guide member 151' disposed below the chain 115 and extending substantially throughout the length of the run a.

Figure 4:
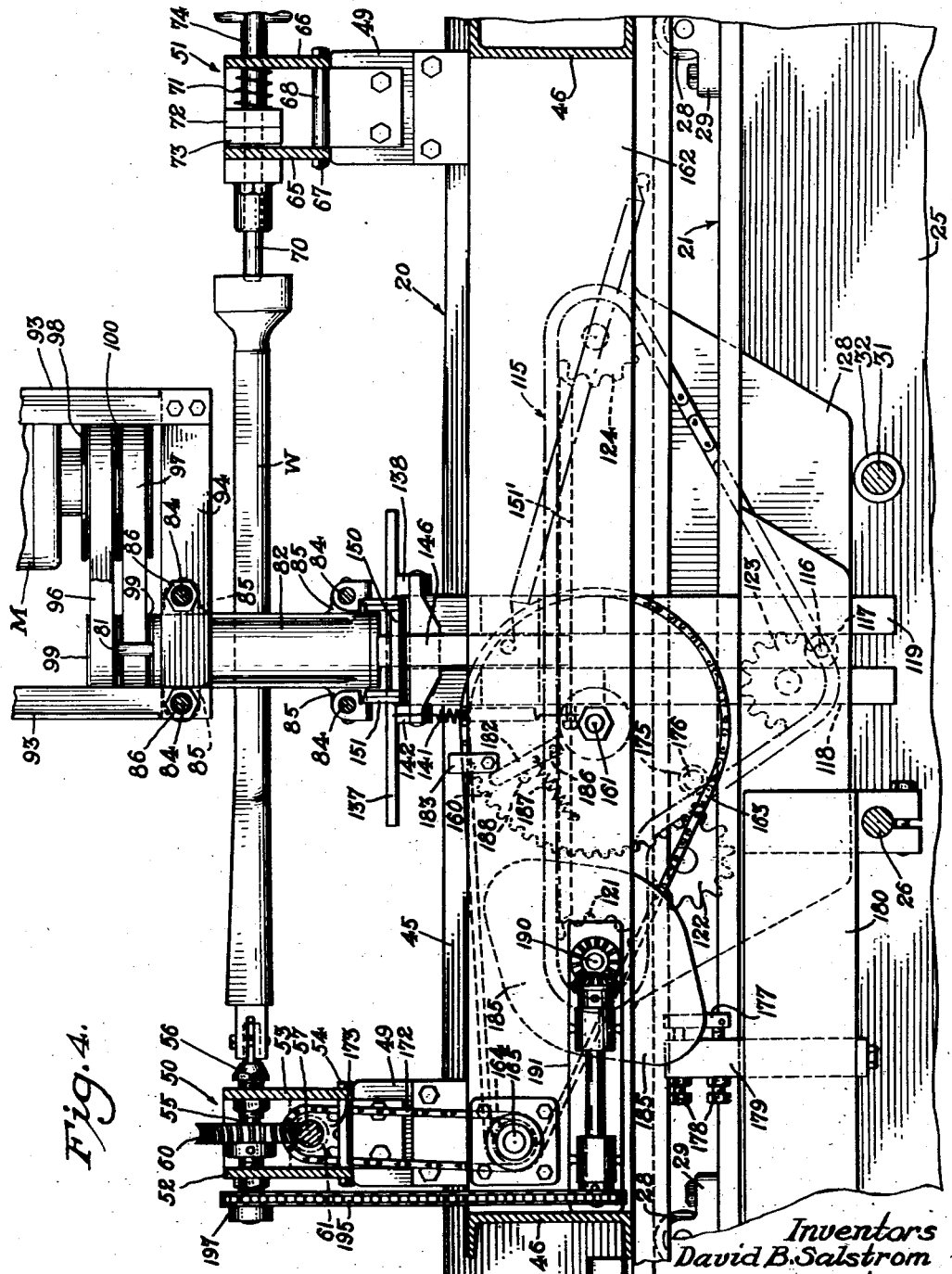
Fig. 4 is a transverse sectional view taken in a vertical plane substantially along the line 4—4 of Fig. 2 showing details of the work and pattern rotating mechanism.

In order to prevent a premature engagement of the cutters with the work blanks at the end of the return movement, means is provided for positively retaining the carrier in retracted positions until the feed movement is definitely under way. This means, as herein shown, comprises a cam bar 152 (Figs. 5 and 10) carried on a supporting member 153 rigidly anchored to the carriage structure. The cam bar is positioned to slip under the lever arm 149 as the carriage approaches the forward position and its upper surface is shaped so as to cam the lever arm upwardly and thus relieve the roller 117 of the pressure of the carriage. As the carriage is fed in the reverse direction, the cam is withdrawn to permit the lever arm to return to the inactive position. Such return is effected gradually thus enabling the cutters to meet the work blanks without shock or jar which would cause undesired vibration. The feeding of the cutters into the work blanks is also assisted by forming the pattern P with a bell-like end section 155 (Figs. 1, 4 and 10).

To enable the cutters to reproduce the entire peripheral surface of the pattern on the work blanks W, the pattern and blanks are rotated synchronously in timed relation to the reciprocation of the carriage 20. In the preferred embodiment of the machine illustrated in Figs. 1-12 of the drawings, the rotation is effected step-by-step thus producing a series of parallel cuts extending longitudinally of the blanks. While any suitable means may be utilized for effecting such rotation of the pattern and work blanks, the invention provides an improved mechanism embodying novel means for automatically regulating the lengths of the rotative steps to enable rounded surfaces of different radii to be finished smoothly and accurately with a conventional cylindrical cutter.

Referring to Figs. 4-7 of the drawings, the pattern and work rotating mechanism in its preferred form comprises a toothed disk 160 journaled on a horizontal stud 161 carried by a cross member 162 forming a part of the framework of the carriage 20. The disk is adapted to be rocked or oscillated in response to the reciprocation of the carriage and such movements are transmitted by a flexible driving member or chain 163 to a sprocket wheel 164 rotatably mounted on a shaft 165. The shaft 165 is disposed at the front of the carriage below and substantially parallel to the spindle driving shaft 57 and, as herein shown, is rotatably supported in suitable bearings carried by the cross member 162 and by a bracket 166 attached to the front frame member 46 of the carriage.

The sprocket wheel 164 is formed with a hub portion 167 having a radially projecting arm 168 carrying a pivoted pawl 169 adapted to coact with the teeth of a ratchet wheel 170 pinned or otherwise rigidly secured to the shaft 165. Thus, when the sprocket wheel and arm 168 are rocked in a clockwise direction (as viewed in Figs. 6 and 7), the ratchet wheel and shaft 165 are carried along in the same direction. Upon reverse movement of the sprocket wheel and arm, the pawl slips over the ratchet teeth while the shaft 165 remains stationary. Rotational movements of the shaft 165 are transmitted through a sprocket wheel 171 and chain 172 to a sprocket wheel 173 fast on the shaft 57 which, as previously explained, is arranged to drive the spindles 55 upon which the pattern P and work blanks W are supported.

By reason of the one-way driving connection provided by the pawl and ratchet mechanism, the spindle drive shaft may be rotated freely by the hand crank 62 without interfering with the operation or adjustment of the driving mechanism. Moreover, unidirectional rotation of the spindle may be obtained from rocking or oscillatory movements of the disk 160. Such movements are imparted to the disk in timed relation and as an incident to the reciprocation of the carriage 20. For this purpose a roller 175 carried on a stud 176 projecting from the inner face of the disk is positioned to engage a stationary stop on the machine frame as the carriage approaches its extreme forward position. The stationary stop, as shown in Figs. 4-7, comprises a vertically disposed stop bar 177 adjustably supported by screws 178 on an upright member 179 adjustably clamped to a pair of frame members 180 rigidly secured between the spacing member 27 and an adjacent tie rod 26 forming a part of the machine frame. By suitably adjusting the position of the member 176 and stop bar 177, the limit position of the disk 160 may be accurately regulated.

Suitable means is provided for yieldably urging the disk 160 in a direction counter to its direction of rotation by engagement with the stationary stop. This means, as herein shown, comprises a tension spring 181 anchored at one end to the disk and at the other end to the carriage framework. Movement of the disk under the influence of the spring is limited by a dog 182 on the disk coacting with a fixed stop 183 on the carriage frame. Thus, in the normal operation of the machine, the disk is adapted to rock between the limit positions shown respectively in Fig. 4 and Fig. 6. In this movement a rotative step of maximum length is imparted to the spindle driving shaft and spindles associated therewith.

Since one limit position of the disk 160 is determined by the position of the stop 177, the range of movement of the disk, and hence the length of the rotative steps imparted to the spindles, may be regulated by varying the position in which the disk is stopped in its return movement. Suitable means is accordingly provided for blocking the disk in selected positions effective to produce rotative steps of the proper length for any particular contour to be formed on the work. This means, in its preferred form, comprises a blocking element or cam 185 adapted to be moved into the path of the dog 182 as shown in Fig. 7. With the cam in blocking position, the return movement of the disk is restricted so that a correspondingly short step is imparted to the shaft 165 and the pattern and work blank spindles. The length of this step is determined by the shape of the cam which can, of course, be formed to provide steps of any desired length within the capacity of the mechanism. Moreover, cams of different contour may be readily interchanged for different types of work.

In order to prevent interference with the forward movement of the disk in the event that the cam is advanced to its active position while the disk is in the normal rest position, the dog 182 is mounted to swing over the cam when the disk moves in a counterclockwise direction. To this end, the dog is pivotally supported as at 186 on the disk and is yieldably held by a spring 187 against a stop pin 188 projecting from the face of the disk.

Any preferred mechanism may be utilized to shift the cam 185 into or out of blocking relation to the dog 182. The invention provides novel means for actuating the cam so as to effect such blocking and unblocking in timed relation with the rotation of the pattern and work blanks, thus enabling the blanks to be finished in accordance with a new and advantageous method of operation.

Referring to Figs. 4 and 5, the cam 185 as herein shown, is fixed on the inner end of a shaft 190 journaled in a bearing formed in a frame 191 carried on the cross member 162 of the carriage. A bevel pinion 192 fixed on the outer end of the shaft meshes with a bevel gear 193 fixed on an intermediate shaft 194 also journaled in the frame 191. The shaft is drivingly connected with one of the spindles 55 by means of a chain 195 running over a sprocket wheel 196 fast on the shaft 194 and a sprocket wheel 197 keyed to said one spindle. Since the spindles are connected by a common drive shaft, the cam 185 is accordingly rotated in timed relation with all the spindles.

The mechanism for controlling the length of the rotative step imparted to the spindles is particularly advantageous in carrying out the improved forming method contemplated by the invention. In accordance with this method, the work blanks and pattern are rotated through relatively long steps while a generally cylindrical cutter is acting on a surface of relatively short radius and the rotative steps are substantially reduced when the cutter is acting on a surface of relatively long radius. Thus, as represented diagrammatically in Figs. 8 and 9, the pattern and work blank are turned through a substantial angle 198 (Fig. 8) while the cutter is operating on the edge portion 199 of relatively short radius.

When the cutter is acting on the side surface 200 of the shoulder portion of the gunstock, that is, on the area having a relatively long radius of curvature, the pattern and work are rotated in relatively short steps as indicated by the spacing of the lines 201 in Fig. 9. In this way the load imposed on the cutter is maintained substantially uniform and the cutter is enabled to produce a true, smooth surface corresponding closely to that of the pattern. It will be appreciated that the changes in the lengths of the rotative steps may be effected either gradually or abruptly as required by the particular pattern being reproduced. With the cam shown, the lengths of the rotative steps increase and decrease progressively as the cutter passes from the long radius area 200 to the short radius area 198 and then on to the opposite side portion of the blank.

It has been found that the above described method of shaping rounded surfaces of different radii results in a much smoother finish than is obtained by rotation of the work and pattern in uniform steps and moreover splintering and other marring of the work is effectually eliminated. In the particular mechanism illustrated, the cam 185 is formed with two diametrically disposed projections effective to produce the changes in the lengths of the rotative steps in each ninety degrees of rotation of the pattern and work. In other words, short rotative steps are produced while the cutters are operating on the opposite side surfaces of the work and longer steps when the cutters are acting on the opposite edge portions thereof. It will be understood of course that cams of other shapes may be employed to provide any desired variation in the rate of work and pattern rotation.

In the operation of the machine, the pattern and work blanks are inserted between their respective headstock and tailstock centers while the follower and tool carrier is held in a retracted position and with the carriage in its extreme forward position. Accurate location of the work blanks is facilitated by a preliminary centering operation in which the ends of the work blanks are drilled for the reception of the centers. With the work blanks and patterns in place, the carrier is released and advances under the action of gravity (to the left as viewed in Figs. 1 and 10) until blocked by the action of the cam bar 152.

Reciprocation of the carriage is now initiated by starting the motor M—1. Driving chain 115 moves bodily toward the rear of the machine with the carriage while the stationary chain link upon which the roller 117 is mounted progresses through the chain run b. As the carriage starts its rearward movement, crank arm 149 moves off the cam bar 152 thus permitting the carrier to advance under the control of the follower F. As the movement of the carrier continues, the follower travels down the bell shaped section 155 of the pattern and then along the edge of the pattern while the cutters reproduce the pattern contour on the work blanks.

The feed movement of the carriage progresses at a moderate rate while the follower traverses the section x of the pattern and then, as the roller 117 passes over the sprocket 123 and progresses through the chain run c, carriage movement is retarded while the follower traverses irregular section y of the pattern. During this portion of the carriage travel, the rate of feed is further retarded by the action of the cam 137 in adjusting the variable speed transmission T for slow feed.

Finally, as the follower leaves the section y of the pattern and while it traverses the section z, or shoulder portion of the pattern, the rate of carriage movement is substantially increased while the roller 117 progresses through the horizontal chain run d. As the follower reaches the end of the pattern, the roller 117 progresses around the outer periphery of the sprocket wheel 121 the carriage is uniformly decelerated, then is uniformly accelerated in the opposite direction to return the carriage to the forward end of the machine frame. During this return movement which is executed at a rapid rate, the action of the roller 117 on the crank arm 145 shifts the carrier to the retracted position to withdraw the cutters from the blanks.

At the end of the return movement, the carriage is again uniformly retarded and then uniformly accelerated in the opposite direction, and the feed cycle above described is repeated. In each such cycle and at the forward end of the carriage stroke, the disk 160 is rocked to rotate the work blanks and pattern one step and thus present a fresh surface for the action of the cutters. The length of this step is determined in accordance with the angular position of the pattern and work blanks by the position of the control cam 185. More particularly, when the follower is engaging the short radius edge portions of the pattern, the rotative steps are relatively large but are substantially decreased as the follower passes on to the long radius side areas of the pattern.

The foregoing cyclic operations are repeated successively until the follower has covered the entire peripheral surface of the pattern and a corresponding contour has been reproduced on the work blanks by the cutters. The reciprocation of the carriage may then be interrupted while the finished workpieces are removed and replaced by a new set of work blanks.

The modified gunstock forming machine shown in Figs. 15 to 18, inclusive, is particularly suitable for producing gunstocks of the type used in the Springfield rifle. The general machine structure, including the base, the pattern and work blank carriage and the follower and cutter carrier may be similar in all respects to those of the machine previously described and corresponding elements are identified with the same reference characters. In the modified machine, a simpler form of carriage drive mechanism may be employed in which the feed rate is varied in timed relation with the rotation of the pattern and work blanks. Moreover, it has been found that with this type of gunstock, a continuous rotary feed may be imparted to the pattern and workpieces thus producing a series of spiral cuts extending around the entire periphery of the work.

Referring more particularly to Figs. 15 and 16, the carriage drive mechanism comprises an endless flexible driving member or chain 115' having one link equipped with a pin 116' and roller 117' adapted to operate in the guideway formed by the guide bars 118 and 119 as previously described. In this instance, however, only two sprocket wheels 121' and 124' are provided for cooperation with the chain 115'. These sprocket wheels are mounted with their rotational axes in the same horizontal plane thus providing two horizontal chain runs. The carriage is accordingly driven at the same rate in both its feeding and return strokes insofar as the action of the chain drive mechanism is concerned.

As in the previous machine, the sprocket wheel 121' is fixed on the shaft 125 driven by the motor M—I through the variable speed transmission T. Changes in the feed rate of the carriage are effected, in this instance, solely by adjustment of the variable speed transmission T.

The mechanism provided for regulating carriage feed rate is similar to the cam mechanism previously described except that in this instance a cam plate 137' of somewhat different contour is provided. The cam plate is mounted on the carrier 138 which, as previously explained, is pivoted on a horizontal shaft 139 carried between a pair of uprights 140 secured to the upper ends of the guide bars 118 and 119. The cam supporting bracket and cam 137' is normally held in a substantially horizontal or active position (shown in full lines in Fig. 17) by a spring 141' acting on an arm 142" projecting rearwardly of the bracket.

For shifting the cam plate to the inactive position shown in broken lines in Fig. 17, there is provided an eccentric blocking member 205 rotatively supported on a stud 206 anchored in a bracket 148' carried on the stationary framework of the machine. The member 205 is recessed on opposite sides to form a pair of outwardly facing shoulders in which adjustable stop screws 207 and 208 are threaded. These stop screws are positioned to coact with a depending flange member 209 carried between a pair of arms 210 and 211 projecting rearwardly from the cam supporting bracket 138. In operation, one of the stop screws, for example, the stop screw 207 is adjusted to allow the cam supporting bracket to rock into the active position and thus position the cam 137' for coaction with the follower 136 on the transmission adjusting shaft. The other stop screw 208 is adjusted to hold the cam supporting bracket in a tilted or inactive position (shown in broken lines in Fig. 17). Thus, by rocking the member 205 to either of its alternate positions, the cam plate may be rendered effective or ineffective to control the rate of movement of the carriage.

While any suitable means may be utilized for positioning the member 205, the invention provides a novel means for performing this function in timed relation to the reciprocation of the carriage and in accordance with the angular positioning of the pattern and work blanks. For this purpose pins 212 and 213 are mounted on the member 205 to project from the outer face thereof on opposite sides of the shaft 206. Mounted on the carriage for coaction with the pins is an actuating member in the form of a generally triangular plate 214. The plate is pivotally supported at its narrow end on a horizontal shaft 215 carried by a frame 216 attached to the front frame member 46 of the carriage.

The wide end of the plate 214 is dimensioned so that only one pin at a time may be engaged and means is provided for shifting it into a position to engage either pin selectively. This means, as herein shown, comprises a cam or eccentric 217 fast on a shaft 218 journaled in the frame 216. The eccentric is confined within a recess 219 formed in a plate 220 assembled in face-to-face relation with the plate 214. Thus by rotating the shaft 218, the triangular plate may be shifted between the extreme positions shown in broken lines in Fig. 18.

In order to coordinate the position of the actuating plate 214 with the rotation of the pattern and work supporting spindles, means is provided for driving the shaft 218 in timed relation with the spindles. This means, as herein shown, comprises a bevel gear 221 fast on the shaft 218 meshing with a bevel pinion 222 on a shaft 223 journaled in the frame 216. A sprocket wheel 224 fast on the shaft 223 is drivingly connected by a chain 225 with a sprocket wheel 226 fast on one of the spindles 55.

When the plate 214 is rocked to its upper position, the pin 213 is forced against the forward edge thereof as the carriage moves to the left thereby rocking the member 205 into the position shown in Fig. 16. The member remains in this position until the plate 214 is rocked downwardly a sufficient distance to be engaged by the pin 212 in a forward stroke of the carriage whereupon the member is rocked to its alternate position to shift the cam plate to the broken line position shown in Fig. 17. In this way the feed control cam 137' is shifted between active and inactive positions in accordance with the position of the pattern and work blanks carried by the spindles.

In the particular machine illustrated, the feed control cam is positioned and the actuating mechanism is timed to slow down the carriage movement while the cutters are acting on the upper edge portion of a blank at the intermediate point $x'$ which is somewhat irregular as will be seen by reference to Fig. 15. While operating on the side portions of the blanks and all other areas of the same, the feed is effected at the maximum rate for which the transmission T is adjusted.

Means is provided in the modified machine for rotating the pattern and work supporting spindles 55 continuously. For this purpose, the outlet shaft 125 of the variable speed transmission T is provided with an extension 125' which is connected by a sprocket wheel 230 and chain 231 with the sprocket wheel 164 of the pawl and ratchet mechanism hereinbefore described. The pawl and ratchet mechanism provides a one-way connection for driving the shaft 57 which, in turn, drives all of the spindles 55. By reason of this one way connection, the shaft 57 and spindles associated therewith may be rotated independently of the power driving means through the medium of the hand crank 62.

It will be apparent from the foregoing that the invention provides a machine of novel and advantageous construction, particularly adapted for the rapid and economical production of gunstocks or similar articles conforming accurately to a selected pattern. By reason of the novel drive mechanism provided, the carriage upon which the work and pattern is supported may be translated at varying feed rates most suitable for the character of the surface being reproduced. Changes in the direction of movement of the carriage are effected smoothly and with complete absence of shock or jar thus insuring accurate reproduction of the entire pattern surface. The carriage drive mechanism, while particularly suitable for machines of the type herein disclosed, is readily applicable to other types of machines having a reciprocatory part.

The invention also provides an improved method of forming curved surfaces of different radii with a conventional cylindrical cutter. For carrying out this improved method, the invention provides a simple and efficient mechanism operative to rotate the work blanks in steps of variable length inversely proportioned to the radius of curvature of the surface being formed.

We claim as our invention:

1. A machine for forming gunstocks and the like comprising, in combination, a carriage mounted for reciprocation in a horizontal plane, means on the carriage for supporting a pattern and a plurality of elongated work blanks in spaced parallel relation with their longitudinal axes extending in the direction of carriage reciprocation, a carrier, a plurality of rotatably driven cutters mounted on said carrier and disposed for engagement with the respective work blanks, a follower mounted on said carrier and positioned to engage said pattern as the cutters engage the work blanks, rails forming a stationary track adapted to support said carrier for movement transversely of the pattern and work blanks, said rails being inclined so as to effect a gravity feed of the follower and cutters to the pattern and work blanks, and power actuated means for reciprocating said carriage.

2. A machine for forming gunstocks and the like comprising, in combination, a stationary frame, a carriage mounted on said frame for reciprocation in a horizontal plane, means on the carriage supporting a pattern and a work blank in parallel spaced relation with their longitudinal axes extending in the direction of carriage reciprocation, a carrier, a follower and a rotatably driven cutter mounted on said carrier and spaced apart for coaction respectively with said pattern and the work blank on the carriage, a bridge forming a part of said stationary frame extending transversely over said carriage, a series of rails on said bridge forming a track adapted to support said carrier with the follower and cutter disposed adjacent the sides of the pattern and work blank respectively, said rails being inclined to effect a gravity feed of the carrier in a direction such as to engage the follower and cutter with the pattern and work blank respectively, and means for reciprocating said carriage to traverse the pattern and work blank past the follower and cutter whereby the cutter is rendered operative to reproduce on the work blank the contour of the pattern area engaged by said follower.

3. A machine for forming gunstocks and the like comprising, in combination, a carriage mounted for reciprocation, means on said carriage operative to support a pattern and an elongated work blank with their longitudinal axes parallel to the reciprocatory path of the carriage, a carrier supported for movement transversely of the pattern and work blank, a rotatably driven cutter mounted on the carrier in position to engage one side of the work blank, a follower mounted on the carrier in position to engage the corresponding side of the pattern and thereby determine the location of the cutter with reference to the work blank, said carrier being yieldably urged in a direction to bring the follower and cutter into engagement with the pattern and work blank respectively, power actuated means for reciprocating the carriage including a speed change device, shiftable cam means arranged to coact with said speed change device incident to the reciprocation of the carriage to vary the rate of movement of the carriage, and mechanism operative to shift said cam means selectively with respect to said speed change device to control the action of said cam means.

4. A machine for forming gunstocks and the like comprising, in combination, a carriage mounted for reciprocation, means on said carriage operative to support a pattern and an elongated work blank with their longitudinal axes parallel to the reciprocatory path of the carriage, a carrier supported for movement transversely of the pattern and work blank, a rotatably driven cutter mounted on the carrier in position to engage the work blank, a follower mounted on the carrier in position to similarly engage the pattern and thereby determine the location of the cutter with reference to the work blank, said carrier being yieldably urged in a direction to bring the follower and cutter into engagement with the pattern and work blank respectively, power actuated means for reciprocating the carriage including a speed changer, a controller for said speed changer having a cam follower, shiftable cam means normally positioned to coact with said follower incident to the reciprocation of the carriage to vary its rate of movement, mechanism operative as the carriage approaches one end of its stroke to shift the carrier in a direction to retract the follower and cutter from the pattern and work when the carriage is moving in one direction, and a member operable to withdraw said cam means to an inactive position when the carriage is moving in said one direction to permit such movement to be executed at a rapid rate.

5. A machine for forming gunstocks and the like comprising, in combination, a carriage mounted for reciprocation, means on said carriage operative to support a pattern and an elongated work blank with their longitudinal axes parallel to the reciprocatory path of the carriage, a carrier supported for movement transversely of the pattern and work blank, a rotatably driven cutter mounted on the carrier in position to engage the work blank, a follower mounted on the carrier in position to engage the pattern and thereby determine the location of the cutter with reference to the work blank, said carrier being yieldably urged in a direction to bring the follower and cutter into engagement with the pattern and work blank respectively, power actuated means for reciprocating the carriage including a speed change device reciprocable with the carriage, a speed controller for said device having a cam follower, cam means supported for movement between active and inactive positions and adapted when in active position to coact with said follower to regulate said speed change device and thereby vary the rate of movement of the carriage, mechanism operated by said power actuated means to shift said carrier so as to retract the follower and cutter from the pattern and work blank when the carriage is moving in one direction, said mechanism being further operative to shift said cam means to an inactive position.

6. A machine for forming gunstocks and the like comprising, in combination, a carriage mounted for reciprocation, means on said carriage operative to support a pattern and an elongated work blank with their longitudinal axes parallel to the reciprocatory path of the carriage, a carrier supported for movement transversely of the pattern and work blank, a rotatably driven cutter mounted on the carrier, a follower mounted on the carrier, said carrier being yieldably urged in a direction effective to move the follower and cutter into operative engagement with the pattern and work blank respectively, power actuated means including a speed changer operative to reciprocate said carriage to traverse the pattern and work blank endwise past the follower and cutter, control means for said speed changer having a cam follower, means for rotating the pattern and work blank about their longitudinal axes to present successive areas for the action of the follower and cutter, cam means having active and inactive positions and adapted when in active position to coact with the cam follower of said speed control means to regulate the rate of movement of the carriage, and means including a member actuated in timed relation to the rotation of the pattern and work blank to shift said cam means between said active and inactive positions.

7. A machine for forming gunstocks and the like comprising, in combination, a carriage mounted for reciprocation, means on said carriage operative to support a pattern and an elongated work blank with their longitudinal axes parallel to the reciprocatory path of the carriage, a carrier supported for movement transversely of the pattern and work blank, a rotatably driven cutter mounted on the carrier, a follower mounted on the carrier, said carrier being yieldably urged in a direction effective to move the follower and cutter into operative engagement with the pattern and work blank respectively, power actuated means including a speed changer operative to reciprocate said carriage to traverse the pattern and work blank endwise past the follower and cutter, a control member for said speed changer, means for rotating the pattern and work blank about their longitudinal axes to present successive areas for the action of the follower and cutter, a member shiftable between active and inactive positions and operative when in the active position to coact with the control member for said speed changer to regulate the rate of movement of the carriage, an actuator operable to shift said member between said active position and said inactive position, and means including a member driven in timed relation to the rotation of the pattern and work blank for selectively controlling the operation of said actuator.

8. A machine for reproducing a pattern having a generally rounded irregular contour comprising, in combination, a reciprocable carriage, means on the carriage for supporting the pattern and a work blank on which the pattern is to be reproduced, a carrier supported for movement transversely of the reciprocatory path of the carriage, an elongated cutter rotatably supported on the carrier and positioned to extend transversely of the work blank, a follower mounted on said carrier and positioned to extend transversely of the pattern, said follower and said cutter being spaced apart similarly to the spacing of the pattern and work blank and movable together as a unit, means for reciprocating the carriage to traverse the pattern and work blank past the follower and cutter whereby to reproduce on the work blank a contour corresponding to the area of the pattern traversed past the follower, indexing mechanism for variably rotating the pattern and work blank step-by-step to present successive areas for engagement by the follower and cutter, and means including a member operating in timed relation to the rotation of said pattern and said blank for coacting with said indexing mechanism to vary the length of said rotative steps and thereby maintain the load on the cutter substantially uniform irrespective of the surface contour being reproduced.

9. A machine for reproducing a pattern of irregular contour having an area formed on a relatively long radius and another area formed on a relatively short radius, said machine comprising, in combination, a reciprocable carriage, means for reciprocating the carriage, means on the carriage for supporting the pattern and a work blank on which the pattern is to be reproduced, means for rotating the pattern and the work blank, a carrier supported for movement transversely of the axes of the pattern and work blank, an elongated rotatably driven cutter mounted on the carrier, a follower mounted on the carrier, said cutter and said follower being spaced apart so as to simultaneously engage the work blank and the pattern and thereby enable the cutter to reproduce the contour of the pattern on the work blank, and control means including a member driven by said pattern and work rotating means operative to modify the action of the same to increase the rate of rotation when the follower is engaging one of the areas of the pattern and to decrease the rate of rotation when the follower is engaging the other of the areas of the pattern whereby the load on the cutter is maintained substantially uniform.

10. A machine for reproducing an elongated pattern of irregular contour having areas formed respectively on relatively short and relatively long radii, said machine comprising, in combination, means supporting the pattern and a work blank with their longitudinal axes generally parallel, means including a variably driven actuating member for rotating the pattern and blank step-by-step about their respective longitudinal axes, a rotatably driven cutter and a follower mounted in fixed spaced relation for engagement with the blank and pattern respectively, means urging the cutter and follower toward the blank and pattern respectively, means for relatively traversing the pattern and blank longitudinally relative to the follower and cutter, said follower acting to variably position the cutter so as to reproduce the contour of the pattern on the blank, and means including a control element rotated in timed relation to the rotation of the pattern and the blank and coacting with said actuating member to vary the length of the rotative steps imparted to the pattern and blank in accordance with the particular area of the pattern presented to the follower.

11. A machine for reproducing an elongated pattern of irregular contour having an area formed with a relatively long radius of curvature and another area formed with relatively short radius of curvature, said machine comprising, in combination, means supporting the pattern and a work blank with their longitudinal axes generally parallel, indexing means for rotating the pattern and blank step-by-step about their respective longitudinal axes, a rotatably driven cutter and a follower mounted in fixed spaced relation for engagement with the blank and pattern respectively, means urging the cutter and follower toward the blank and pattern respectively, means for relatively traversing the pattern and blank longitudinally relative to the follower and cutter, said follower acting to variably position the cutter so as to reproduce the contour of the pattern on the blank, said indexing means including an actuating member responsive to such relative traversing movements, and control means for said indexing means including a member coacting with said actuating member to condition the indexing means for imparting relatively small rotative steps to the pattern and blank when the follower is engaging the long radius pattern area and to impart substantially longer rotative steps to the pattern and blank when the follower is engaging the short radius pattern area.

12. In a pattern reproducing machine, in combination, a reciprocatory carriage, spaced centers on said carriage for holding a pattern and a work blank in parallel spaced relation, a shaft arranged to rotate said centers in synchronism, means for driving said shaft including a rotatable member yieldably urged toward a limit position and adapted to be rocked away from said position by the carriage in its reciprocation, means providing a one-way driving connection effective to transmit the movements of the member in one direction to said shaft, a fixed stop positioned to define the limit position of the member and thereby determine the maximum range of movement of the member by the carriage, rotatable cam means adapted to variably restrict the movement of the member toward said limit position and thereby correspondingly vary the extent of movement of the member by the carriage, and means for driving said cam means in timed relation to the rotation of said centers.

13. In a pattern reproducing machine, in combination, a reciprocatory carriage, spaced centers on said carriage for holding a pattern and a work blank in parallel spaced relation, a shaft arranged to rotate said centers in synchronism, means for driving said shaft including a rotatable member yieldably urged toward a limit position and adapted to be rocked away from said position in response to the reciprocation of the carriage, means providing a one-way driving connection effective to transmit the movements of the member in one direction to said shaft, a fixed stop operative to define the normal limit position of the member and thereby determine the maximum range of movement of the member, a movable stop having an inactive position and an active position in which it is effective to define a second limit position for the member and thereby restrict the range of movement of the member, and means operating in timed relation to the rotation of said shaft for shifting said movable stop between said active and inactive positions.

14. In a pattern reproducing machine, in combination, a reciprocatory carriage, spaced centers on said carriage for holding a pattern and a work blank in parallel spaced relation, a shaft arranged to rotate said centers in synchronism, means for driving said shaft including a rotatable member yieldably urged toward a limit position and adapted to be rocked away from said position in response to the reciprocation of the carriage, means providing a one-way driving connection effective to transmit the movements of the member in one direction to said shaft, a stop normally operative to define the limit position of the member and thereby determine the extent of movement of the member by the carriage, and a second stop adapted to be interposed in blocking relation to said member to define a different limit position and thereby restrict the range of movement of the member.

15. The combination with a work support and a tool support, of means on the work support for rotating a workpiece, mechanism operative to reciprocate one of said supports to effect a relative traverse of the tool and work parallel to the axis of rotation of the work, a prime mover operative to drive said mechanism, a speed changer interposed between said prime mover and said mechanism, a controller, and mechanism operating in timed relation with said work rotating mechanism and acting on said controller to regulate said speed changer.

16. The combination with a reciprocable work support, of means on the work support for rotating a workpiece, power actuated means for effecting reciprocation of the support, control means for said power actuated means including a speed control element, and mechanism operated in timed relation with said work rotating means and including a device for actuating said speed control element to regulate the rate of reciprocation of the support.

17. The combination with a work support and a tool support, of means on the work support for rotating a workpiece, power actuated means for effecting relative reciprocation between the supports, a control device associated with said power actuated means including a speed control element, and control mechanism including a member operated in timed relation with said work rotating means and coacting with said element to govern the operation of said control device.

18. In a pattern reproducing machine, in combination, a reciprocatory carriage, spaced centers on said carriage for holding a pattern and a work blank in parallel spaced relation, a shaft operative to rotate said centers in synchronism, means for driving said shaft including an actuating member, spring means yieldably urging said actuating member toward a limit position, means engageable by said carriage to shift said actuating member away from said limit position and to tension said spring means in response to the movement of said carriage in one direction, said spring acting to return the actuating member to said limit position upon movement of the carriage in the opposite direction, shiftable stop means coacting with said actuating member to variably determine said limit position, and means providing a one way driving connection effective to transmit the return movements of said member to said shaft.

DAVID B. SALSTROM.
DAVID N. SALSTROM.